(12) United States Patent
Wang et al.

(10) Patent No.: US 6,217,058 B1
(45) Date of Patent: Apr. 17, 2001

(54) FOLDING APPARATUS OF A FRONT SUPPORT FOR A SKATEBOARD

(76) Inventors: Leao Wang; Peter Wu, both of No 1, Lane 233, Sec. 2, Charng Long Rd., Taiping (TW), 411

( * ) Notice: Subject to any disclaimer, the term of this patent is extended or adjusted under 35 U.S.C. 154(b) by 0 days.

(21) Appl. No.: 09/586,922

(22) Filed: Jun. 5, 2000

(51) Int. Cl.$^7$ ............... B62B 1/00; B62M 1/00; B62C 1/00; B62K 1/00
(52) U.S. Cl. ................. 280/655.1; 280/87.041; 280/87.021; 280/63; 280/287
(58) Field of Search ............ 280/87.041, 87.021, 280/655.1, 63, 287

(56) References Cited

U.S. PATENT DOCUMENTS

| | | | |
|---|---|---|---|
| 1,442,808 | * | 1/1923 | Huseman ................. 280/87.021 |
| 1,444,295 | * | 2/1923 | Wynne ..................... 280/87.021 |
| 1,472,164 | * | 10/1923 | Gilbert ..................... 280/87.041 |
| 1,516,105 | * | 11/1924 | Kinoshita ................. 280/87.041 |
| 1,968,975 | * | 8/1934 | Upsacker et al. ........ 280/87.041 |
| 4,394,029 | * | 7/1983 | Holmgren ................ 280/87.041 |
| 4,587,864 | * | 5/1986 | Kassai ...................... 280/47.371 |
| 4,733,882 | * | 3/1988 | Kassai ...................... 280/655.1 |
| 4,821,832 | * | 4/1989 | Patmont .................. 280/87.041 |
| 4,924,725 | * | 5/1990 | Takahashi et al. ....... 280/47.371 |
| 5,184,835 | * | 2/1993 | Huang ...................... 280/655.1 |
| 5,625,923 | * | 5/1997 | Huang ...................... 280/47.371 |
| 5,695,021 | * | 12/1997 | Schaffner et al. ........ 280/287 |
| 5,816,604 | * | 10/1998 | Hsieh et al. .............. 280/655.1 |
| 5,820,146 | * | 10/1998 | Van Ligten .............. 280/87.041 |
| 5,845,917 | * | 12/1998 | Huang ...................... 280/655.1 |
| 5,911,424 | * | 6/1999 | Rovinsky ................. 280/655.1 |
| 5,927,733 | * | 7/1999 | Banda ...................... 280/87.041 |
| 6,012,539 | * | 1/2000 | Patmont .................. 280/87.041 |
| 6,024,376 | * | 2/2000 | Golichowski et al. .... 280/655.1 |
| 6,073,944 | * | 6/2000 | Moore ...................... 280/655.1 |
| 6,158,751 | * | 12/2000 | Wu et al. ................. 280/87.041 |

* cited by examiner

*Primary Examiner*—Brian L. Johnson
*Assistant Examiner*—Joselynn Y. Sliteris
(74) *Attorney, Agent, or Firm*—Kuo-Hsiung Chiu

(57) ABSTRACT

A folding front support for a skateboard, in which the front support has a longitudinal groove at two sides near the bottom end including an expansion ring at the top and middle positions. Two pivoting ears each with a throughhole are fitted on the connection part between the frame and the front support. A turning pin with an oval member is inserted into the throughholes of the pivoting ears, and a fixing effect will then be created by means of a fixing ring. A deep groove is disposed between the pivoting ears so that the front support whose outer diameter is smaller than the inner diameter of the deep groove can be plugged into the deep groove in a telescopic state for adjusting the upright height of the front support. Furthermore, the front support can be folded in direction toward the rear side of the frame.

2 Claims, 4 Drawing Sheets

FOLDING APPARATUS OF A FRONT SUPPORT FOR A SKATEBOARD

BACKGROUND OF THE INVENTION

1. Field of the Invention

The present invention relates to a folding apparatus for a front support of a skateboard, and more particularly to an apparatus used for adjusting the height of the front support or for folding it.

2. Description of the Prior Art

Taiwan Patent Nos. 377689 and 390314 disclose a folding apparatus for a skateboard which is disposed near the front end of a frame. Consequently, the wheel assembly will be raised upwards when the front support is folded by means of the folding apparatus. Thus, the total volume after folding can't be reduced to the minimum, and the packing and transportation cost is therefore increased.

Furthermore, the front support of the conventional skateboard is fitted with a telescopic device which is able to adjust the upright height of the front support and the horizontal length thereof. However, the folding has to be done step by step so that it's complicated and inconvenient in using and packing. Moreover, the device is made more complicated.

SUMMARY OF THE INVENTION

It is a primary object of the present invention to provide a folding and telescopic apparatus for a skateboard by which the operation of the skateboard is simplified; moreover, the whole body of the skateboard can be minimized in volume by choosing a best folding position after being folded. Accordingly, the packing, transporting and storing space can be effectively reduced.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
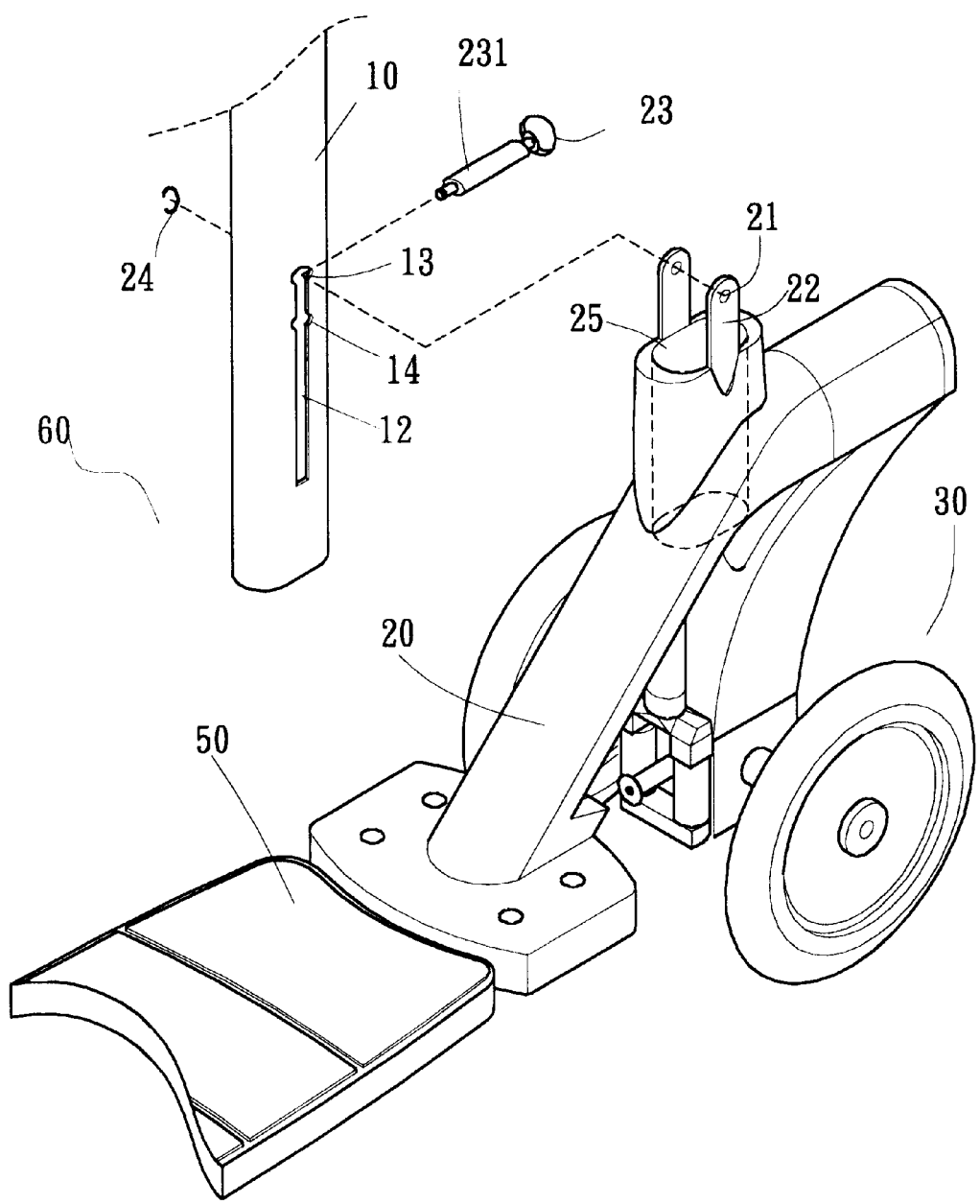
FIG. 1 is a perspective exploded view of the present invention.
Figure 2:
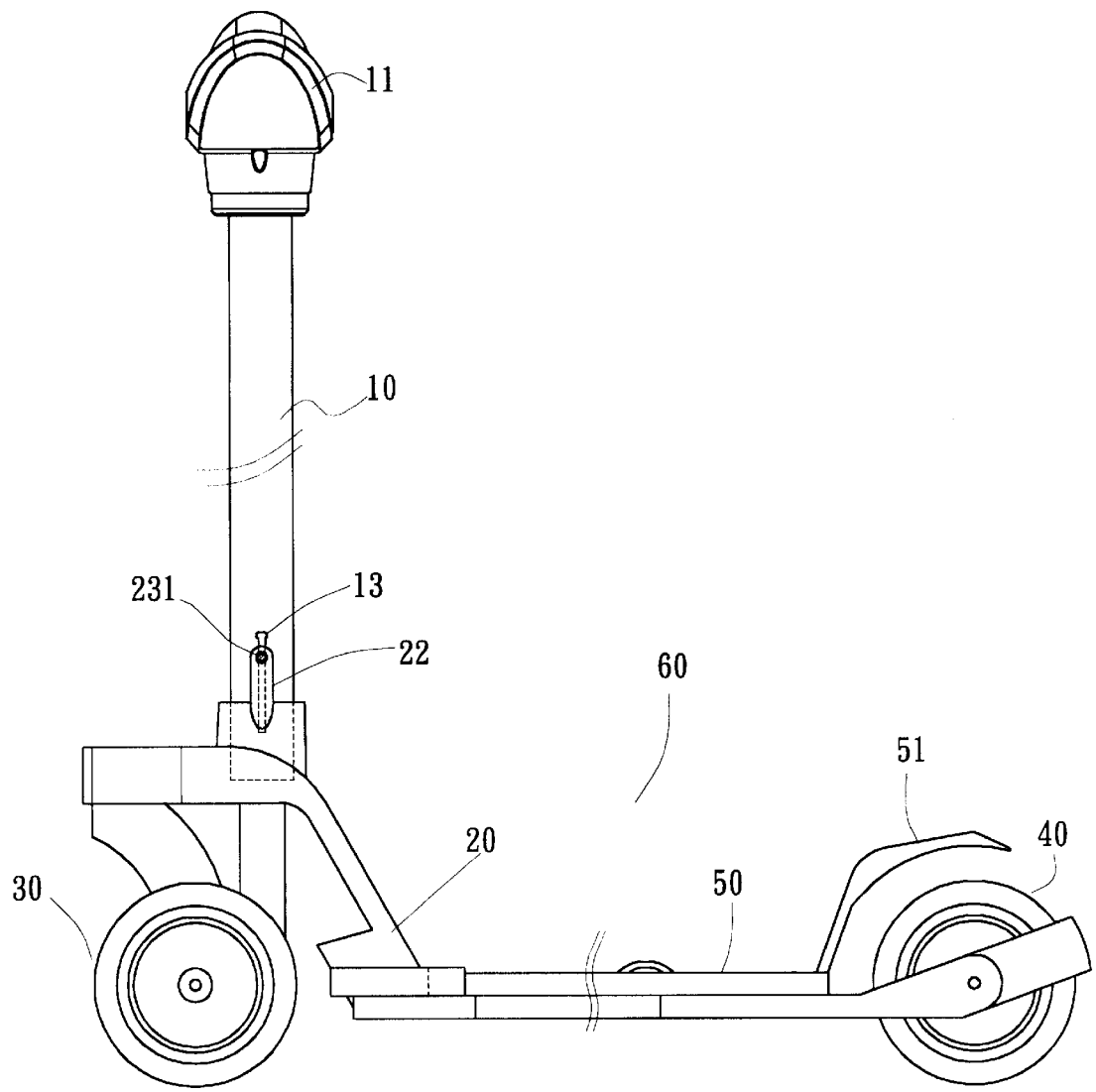
FIG. 2 is a schematic drawing of the front support of the present invention in an upright usable state.

First of all, referring to FIGS. 1 and 2, the skateboard in accordance with the present invention primarily includes:

a front support 10 having a handgrip 11 at the top thereof, the bottom thereof being attached to a frame 20;

a frame 20 having a front and rear wheel assembly 30, 40, respectively, at the front and rear ends thereof, a deck 50 being mounted on the top thereof whose tail is raised and disposed above the rear wheel assembly 40 to be formed as a braking plate 51.

The present invention is characterized in that the front support 10 is fitted with a longitudinal groove 12 at two sides near the bottom end thereof respectively, and that the longitudinal groove 12 includes expansion rings 13, 14 at the top and middle positions thereof respectively, and that two pivoting ears 22 each with a corresponding throughhole 21 are fitted on the connection part between the frame 20 and the front support 10. A turning pin 23 with an oval member 231 can be inserted into the throughholes 21 of the pivoting ears 22, and a fixing effect will then be created by means of a fixing ring 24. Moreover, a deep groove 25 is disposed between the pivoting ears 22 so that the front support 10 whose outer diameter is smaller than the inner diameter of the deep groove 25 can be plugged into the deep groove 25 to be formed in a telescopic state for adjusting the upright height of the front support 10. Furthermore, the front support 10 can be folded in a direction of the rear side of the frame 20 by means of the above-mentioned device.

Figure 3:
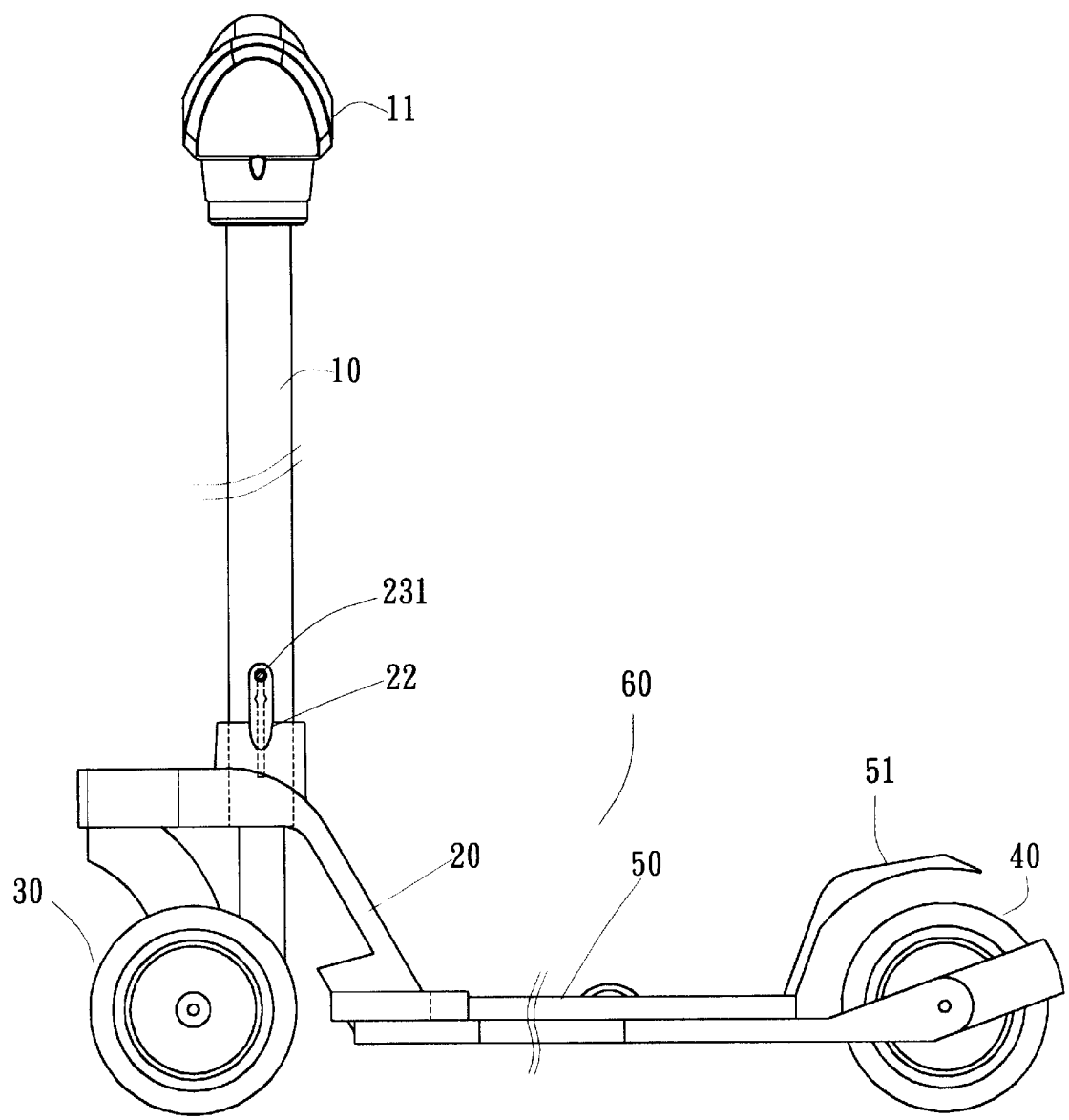
FIG. 3 is a schematic drawing of the adjustment of the height of the front support of the present invention.

Referring to FIGS. 2 and 3, when the front support 10 is situated in an upright usable state, the bottom end of the front support 10 enters into the deep groove 25 of the frame 20 while the position of the turning pin 23 is aligned with the expansion ring 13 or 14. At this time, the oval member 231 of the turning pin 23 is just laterally locked in the expansion ring 13 or 14 and a tight fixing is created. When a different expansion ring 13 or 14 is chosen as the connection point, the upright height of the front support 10 can be smoothly adjusted.

Of course, the number of the expansion rings 13, 14 can be increased in order to enhance the height adjustment of the front support 10.

Figure 4:
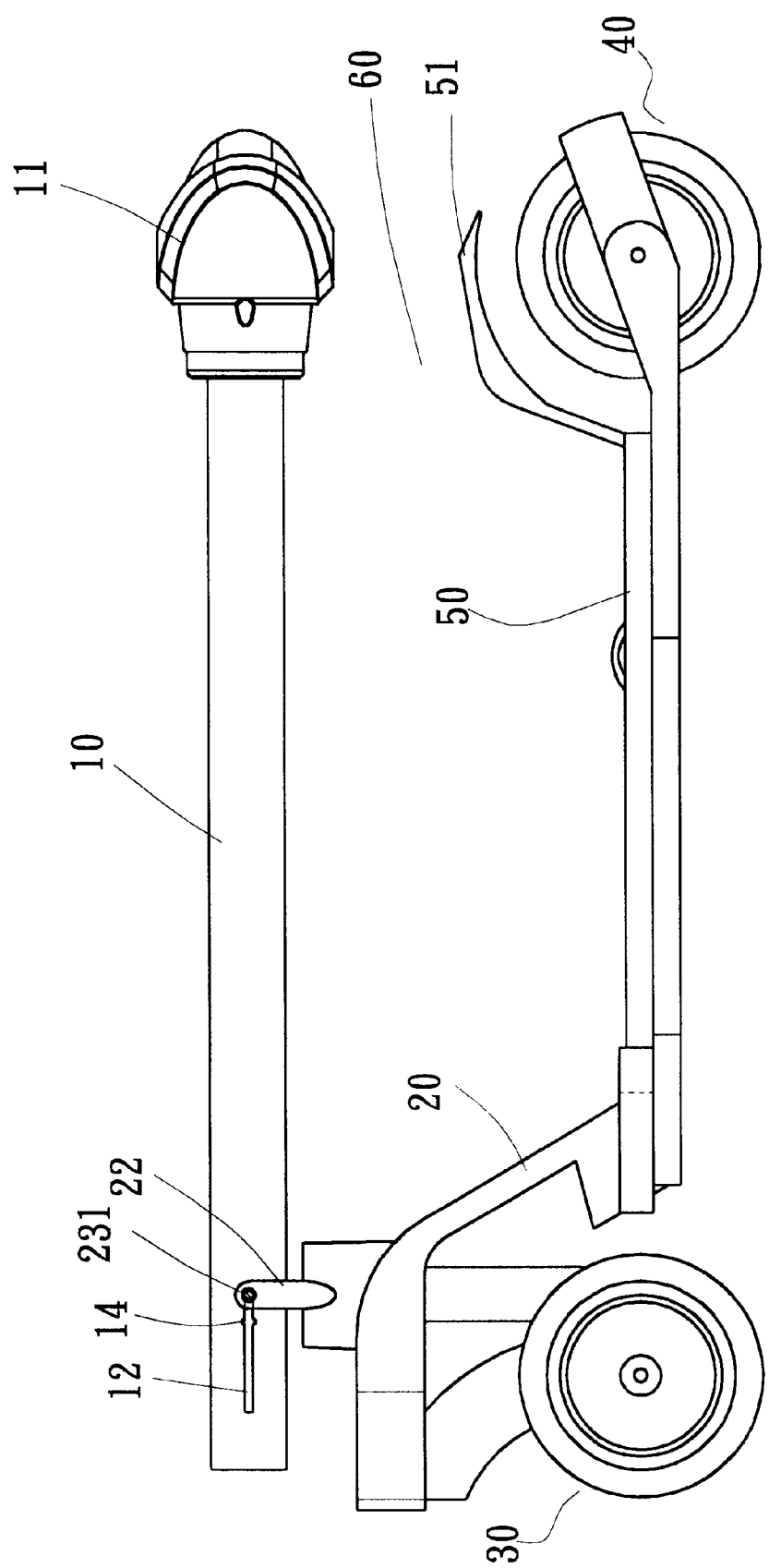
FIG. 4 is a schematic drawing of the position to fold the front support of the present invention.

As shown in FIG. 4, in order to fold the front support, the turning pin 23 is turned by 90 degrees in order that the oval member 231 of the turning pin 23 is axially situated to slide in the longitudinal groove 12. Thereafter, the front support 10 is pulled upwards and the bottom end thereof is separated from the deep groove 25. At that time, the front support 10 can be folded in direction toward the rear side of the frame 20 to be in a horizontal state. Thereafter, the horizontal front support 10 is shifted in the direction of the front side of the frame 20 until the oval member 231 of the turning pin 23 is aligned with the expansion ring 13 or 14 so that the turning pin 23 can be turned by 90 degrees in a locking and fixing state. In addition to facilitate the carrying, the original length of the body 60 after folding can be maintained while its volume is tremendously reduced.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A folding front support for a skateboard comprising:
    a frame having a front and rear wheel assemblies at front and rear ends thereof;
    a deck mounted on top of the frame and having a raised tail disposed above said rear wheel assembly to act as a braking plate;
    a front support having a handgrip at a top end thereof and a bottom end, the front support having a longitudinal groove at two sides near the bottom end thereof, said longitudinal grooves each including at least one expansion ring; two pivoting ears each with a corresponding throughhole fitted on a connection part between said frame and said front supports a turning pin with an oval member inserted into said throughholes of said pivoting ears, and through one of the expansion rings to removably attach the front support to the frame; and a deep groove formed between said pivoting ears and having an inner cross-sectional dimension greater than an outer cross sectional dimension of the bottom end of the front support enabling the bottom end of the front support be plugged into said deep groove in a telescopic manner for adjusting an operational upright height of said front support, whereby the front support can be folded in a direction toward the rear end of said frame.

2. The folding front support for a skateboard as claimed in claim 1, further comprising a plurality of said expansion rings in order to enhance the height adjustment range of said front support.

* * * * *